United States Patent [19]

Steininger et al.

[11] Patent Number: 4,959,243

[45] Date of Patent: Sep. 25, 1990

[54] PRODUCTION OF A SHEET-LIKE, MULTILAYER MAGNETO-OPTICAL RECORDING MATERIAL

[75] Inventors: Helmut Steininger, Worms, Fed. Rep. of Germany;

[73] Assignee: BASF Aktiengesellschaft, Ludwigshafen, Fed. Rep. of Germany

[21] Appl. No.: 300,849

[22] Filed: Jan. 24, 1989

[30] Foreign Application Priority Data

Feb. 2, 1988 [DE] Fed. Rep. of Germany ....... 3803013

[51] Int. Cl.$^5$ .............................................. H01F 10/02
[52] U.S. Cl. .................................... 427/48; 427/130; 427/131; 427/132; 427/164; 427/250; 427/255.3; 427/255.7; 428/694; 428/900
[58] Field of Search ............................... 427/127–132, 427/48, 250, 255.13, 255.7, 164; 428/900, 64, 694

[56] References Cited

U.S. PATENT DOCUMENTS 4,658,388 4/1987 Ishiwatari et al. .

*Primary Examiner*—Bernard Pianalto
*Attorney, Agent, or Firm*—Keil & Weinkauf

[57] ABSTRACT

A magneto-optical recording element comprising a film (C) consisting essentially of multiple separate carbide, nitride and/or oxide layers is produced on a surface to be covered by a process comprising the following steps:

(I) application of a 30–500 nm thick film ($C_1$) via the gas phase to the relevant surface to be covered, the said film ($C_1$) having the following specifications:

($C_{11}$) the film ($C_1$) consists of two or more components;

($C_{12}$) the said components are present in three or more separate elements and element carbide, nitride and oxide layers, each consisting of one or more of the said components;

($C_{13}$) the components of the said element layers are selected from the group consisting of boron, aluminum, gallium, indium, silicon, germanium, tin, lead, antimony, bismuth, magnesium, titanium, zirconium, hafnium, vanadium, niobium, tantalum, chromium, molybdenum, tungsten, iron, cobalt, zinc, cadmium, lanthanum, cerium, praseodymium, neodymnium, samarium, europium, gadolinium, terbium, dysprosium, holmium, erbium, thulium, ytterbium, lutetium and thorium;

($C_{14}$) the components of the said element carbide, nitride and oxide layers are selected from the group consisting of the carbides, nitrides and oxides of the said elements ($C_{13}$);

($C_{15}$) directly adjacent layers consisting of carbides, nitrides and/or oxides ($C_{14}$) differ in composition from one another;

($C_{16}$) two or more of the said layers ($C_{14}$) are separated from one another by one or more 0.1–30 nm thick layers consisting of one or more of the elements ($C_{13}$); and ($C_{17}$) that layer which is directly adjacent to the recording layer or which faces it is always one of the said layers ($C_{14}$), by carrying out the following two process steps several times:

(I1) application of one or more of the said layers ($C_{14}$) to the relevant surface via the gas phase and (I2) application of one or more of the element layers ($C_{13}$) to the surface of the layer ($C_{14}$) produced beforehand, resulting in the said film ($C_1$), followed by (II) reaction of the film (C hd 1) with reactants selected from the group consisting of oxygen, nitrogen and carbon, resulting in the said film (C).

3 Claims, No Drawings

PRODUCTION OF A SHEET-LIKE, MULTILAYER MAGNETO-OPTICAL RECORDING MATERIAL

The present invention relates to a novel, improved process for the production of a sheet-like, multilayer magneto-optical recording material comprising (A) an optically transparent dimensionally stable substrate, (B) a thermally alterable recording layer consisting of an amorphous lanthanide/transition metal alloy and having, at least on that side of the recording layer (B) which faces away from the substrate (A), (C) a film consisting of a single carbide, nitride and/or oxide layer or multiple carbide, nitride and/or oxide layers, in which the individual layer (B) and film (C) are applied to the substrate (A) in the desired order, number and thickness and with the particular composition desired, via the gas phase, after which a defined magnetization oriented at right angles to the surface of the recording layer (B) is induced in the said recording layer.

A recording material of this type is disclosed in DE-A-No. 33 35 689. In this material, the recording layer (B) is from 20 to 100 nm thick. Three films are located on its side which faces away from the substrate (A), each of these films performing a defined function. For example, the first film consists of a material having a high refractive index of 2.0 or higher, for example titanium oxide, cerium oxide, antimony oxide, tungsten oxide, silicon oxide, bismuth oxide or cadmium oxide. This film serves as an interference film. The second film consists of metals such as copper, silver, chromium, aluminum, rhodium, gold or nickel and is a reflector film. The uppermost film is referred to as an antioxidation film. It consists of magnesium oxide, aluminum oxide, silicon oxide, titanium oxide or thorium oxide and is more than 100 nm thick.

The total thickness of the three films is greater than 500 nm. Moreover, the combination of these three films is not optically transparent.

Another embodiment of the recording material disclosed in DE-A-No. 33 35 689 has only the abovementioned interference film and the abovementioned antioxidation film. This combination of two films is optically transparent but is substantially thicker than 500 nm.

The recording material disclosed in DE-A-No. 35 34 571 has a similar structure. Here, the first of the films applied to the recording layer (B) consists of a mixture of silicon carbide and silicon nitride or silicon carbide and aluminum nitride and serves both as a protective film and as an interference film. A suitable second film is a reflecting film of a metal such as copper, aluminum or gold. An anticorrosion film of any type may be arranged on top of this. The recording material may contain further auxiliary films, such as an interference film of silicon monoxide, magnesium fluoride, niobium oxide, tantalum oxide, aluminum oxide, aluminum nitride or silicon nitride.

Furthermore, DE-A-No. 35 00 314 discloses a recording material having a film which consists of an oxide/nitride mixture and serves both as an anticorrosion film and as an interference film.

These known recording materials are used for the laser-optical recording of data with the aid of pulse-modulated laser beams, which are focused on the recording layers (B) and/or strike these layers at right angles.

In the case of laser-optical recording of data, an external auxiliary magnetic field is applied to these recording materials, the field lines of the said magnetic field being aligned at right angles to the surface of the recording layers (B), or the recording layers (B) have a correspondingly aligned, immanent, i.e. intrinsic, magnetic field.

It is known that the recording layers (B) which consist of amorphous ferrimagnetic lanthanide/transition metal alloys and are magnetized at right angles to their surface are heated by the laser beam at the point of contact during recording of the data. As a result of the heating, the coercive force $H_c$ of the alloys decreases. If the coercive force $H_c$ falls below the field strength of the applied external auxiliary magnetic field or of the immanent, i.e. intrinsic, magnetic field at a critical temperature dependent on the particular alloy used, an area which has a magnetization direction opposite the original direction is formed at the point of contact. Such an area is referred to as a spot.

The recorded data can, if required, be deleted again by controlled local heating of the recording layer (B), for example by means of a laser beam in the presence of an external or intrinsic magnetic field whose field lines are aligned at right angles to the layer surface, after which new data can be recorded, i.e. the writing is reversible.

The data are read using linearly polarized light of a continuously emitting continuous-wave laser whose light power is insufficient to heat the material above the critical temperature. This laser beam is reflected either by the recording layer (B) itself or by a reflector film arranged behind it, resulting in an interaction between the magnetic moments in the recording layer (B) and the magnetic vector of the laser light wave. As a result of this interaction, the plane of polarization $\vec{E}$ of the laser light which is reflected by a spot or by a reflector film behind is rotated through a small angle with respect to the original plane. If this rotation of the plane of polarization $\vec{E}$ takes place during reflection of the light at the recording layer itself, this is referred to as the Kerr effect and the angle of rotation is accordingly referred to as the Kerr angle; if, on the other hand, the plane is rotated during passage of the light twice through the recording layer, the terms Faraday effect and Faraday angle are used.

This rotation of the plane of polarization $\vec{E}$ of the laser light reflected by the recording material can be measured and can be converted into signals with the aid of suitable optical and electronic apparatuses.

If the Faraday effect is utilized in the known recording materials during reading of the data, the said recording materials must contain a reflector film, since the recording layers (B) as such are transparent to light. Moreover, interference films must be present in order to suppress interfering diffraction phenomena.

Of course, the interference films, reflector films and antioxidation films present in the known recording materials, and the combinations of these films also act as oxygen barriers which, to a certain extent, prevent corrosion of the extremely oxygen-sensitive and water-sensitive recording layer. However, they do not perform this function to an extent which is sufficient in practice, so that it is also necessary concomitantly to use anticorrosion films, which seal the recording layer (B) from the air and, if necessary, from the substrate (A).

The known combination of an interference film, a reflector film and an antioxidation film cannot be regarded as a single anticorrosion film composed of multiple separate layers, since the structure and composition of the combination are not determined exclusively by their anticorrosion effect but mainly by their other functions.

Regarding the anticorrosion action, the known combination has disadvantages. In particular, its action as an oxygen barrier is unsatisfactory unless it contains a comparatively thick layer of, for example, aluminum oxide on the air side. Moreover, the choice of the components of the remaining films, made from other points of view, gives rise to disadvantages with respect to the adhesion of the films to one another, the shelf life, the internal stress or the mechanical strength. For example, a known combination which may be optimal with regard to interference and reflection can have a poor anticorrosion action. Alternatively, its anticorrosion action is satisfactory but its shelf life is unsatisfactory. If, in this case, components which give a particularly hard upper film are chosen, the known combination of films together may be so brittle that it fractures under slight mechanical stress. Furthermore, internal stresses therein may cause cracks. All this has an adverse effect on the anticorrosion action.

However, protection against corrosion is of fundamental importance precisely in the case of the recording materials under discussion, since their recording layers (B) are extremely rapidly destroyed by water and/or atmospheric oxygen, resulting in a total loss of the data recorded therein.

Regarding protection of the recording layers (B) from corrosion, significant progress was achieved with the aid of the anticorrosion film described in German Patent Application No. P 37 16 738.7 (O.Z. 0050/39188). This anticorrosion film is from 30 to 250 nm thick and consists of two or more components which are present in four or more separate layers, each consisting of one of the components. Here, one or more of the components are selected from the group consisting of the elements boron, aluminum, silicon, titanium, zirconium, hafnium, vanadium, niobium, tantalum, chromium, molybdenum and tungsten, and one or more of the other components are selected from the group consisting of the carbides, nitrides and oxides of these elements. Furthermore, directly adjacent layers always consist of components which differ from one another. In an embodiment of this anticorrosion film, the uppermost layer consists of $Al_2O_3$, which is produced by oxidation of the surface of an aluminum layer with air. However, it is not the entire aluminum layer that is oxidized; instead, it continues to be present as a separate but now thinner layer in the anticorrosion film. Because of its layer(s) consisting of elements, this anticorrosion film is not optically transparent. It can therefore be used only for covering that side of the recording layer (B) which is not exposed to laser light.

To date, the known anticorrosion films have been produced by the conventional and known techniques for the production of thin films by vapor deposition, reactive vapor deposition, ion plating, ion cluster beam deposition (ICB) or sputtering, including reactive sputtering. Sputtering is preferably used. For this purpose, the appropriate metals, oxides, nitrides and/or carbides in pure form are sputtered from a target in a known manner in the desired order and amount, under greatly reduced pressure, and are deposited on suitable substrates (A) or on films already present thereon. Alternatively, the anticorrosion films are built up in the desired manner by sputtering the pure metal and mixing the desired amount of oxygen, nitrogen or hydrocarbons with the process gas at a suitable time, this procedure generally also being referred to as reactive sputtering. If, in this procedure, the target is present in a magnetic field, the term reactive magnetron sputtering is used.

However, the anticorrosion films produced by the known processes are still unsatisfactory with respect to their optical transparency and/or the thickness required for adequate protection, so that there continues to be an urgent need for thin, non-transparent or optically transparent anticorrosion films which have a reliable protective action, and for a feasible process for their production.

It is an object of the present invention to provide a process for the production of a sheet-like, multilayer magneto-optical recording material comprising (A) an optically transparent dimensionally stable substrate, (B) a thermally alterable recording layer consisting of an amorphous lanthanide/transition metal alloy and, at least on that side of the recording layer (B) which faces away from the substrate (A), (C) a film consisting of a single carbide, nitride and/or oxide layer or multiple carbide, nitride and/or oxide layers, in which the individual layer (B) and film (C) are applied to the substrate (A) in the desired order, number and thickness and with the particular internal structure desired, via the gas phase, after which a defined magnetization oriented at right angles to the surface of the recording layer (B) is induced in the said recording layer, and which gives anticorrosion films which do not have the disadvantages of the prior art.

We have found that this object is achieved by a process for the production of a sheet-like, multilayer magneto-optical recording material comprising (A) an optically transparent dimensionally stable substrate, (B) a thermally alterable recording layer consisting of an amorphous lanthanide/transition metal alloy and, at least on that side of the recording layer (B) which faces away from the substrate (A), (C) a film consisting of a single carbide, nitride and/or oxide layer or multiple carbide, nitride and/or oxide layers, in which the individual layer (B) and film (C) are applied to the substrate (A) in the desired order, number and thickness and with the particular internal structure desired, via the gas phase, after which a defined magnetization oriented at right angles to the surface of the recording layer (B) is induced in the said recording layer, wherein the film (C) is produced on one or both sides of the recording layer (B) by (I) application of 30–500 nm thick film ($C_1$) of ($C_{11}$) two or more components which ($C_{12}$) are present in three or more separate elements and element carbide, nitride and oxide layers, each consisting of one or more of the components, ($C_{13}$) the component(s) of the element layer(s) are selected from the group consisting of the elements B, Al, Ga, In, Si, Ge, Sn, Pb, Sb, Bi, Mg, Ti, Zr, Hf, V, Nb, Ta, Cr, Mo, W, Fe, Co, Zn, Cd, La, Ce, Pr, Nd, Sm, Eu, Gd, Tb, Dy, Ho, Er, Tm, Yb, Lu and Th and ($C_{14}$) the component(s) of the element carbide, nitride and oxide layer(s) are selected from the group consisting of the carbides, nitrides and oxides of these elements ($C_{13}$), and ($C_{15}$) directly adjacent layers of carbides, nitrides and/or oxides ($C_{14}$) differ in composition from one another, ($C_{16}$) two or more of the layers consisting of carbides, nitrides and/or oxides ($C_{14}$) are separated from one another by one or more 0.1–30 nm thick layers consisting of one or more of the elements ($C_{14}$) and ($C_{17}$) that layer which is directly adjacent to the recording layer (B) or which faces it always consists of carbides, nitrides and/or oxides ($C_{14}$), and by (II) reaction of the layer(s) of the film ($C_1$) which consist of one or more of the elements ($C_{13}$) with oxygen, nitrogen and/or carbon.

The process according to the invention for the production of a sheet-like, multilayer magneto-optical recording material is referred to below as the novel process for brevity. The term "sheet-like" includes all spatial forms whose thickness is substantially smaller than their length and width. The novel recording materials can accordingly be tape-like, plate-like or disk-like, the disk-like ones, which are generally referred to as disks, being generally advantageous.

The novel process is described in detail below, by way of example, for the production of a sheet-like, multilayer magneto-optical recording material comprising a substrate (A), a recording layer (B) and a film (C) which is present on that side of the recording layer (B) which faces away from the substrate (A).

This embodiment of the novel process preferably starts from a conventional and known disk-shaped, optically transparent dimensionally stable substrate (A) which has a diameter of 90 or 130 mm and a thickness of 1.2 mm and consists of glass or of a plastic, for example polycarbonate, polymethyl methacrylate, polymethylpentene, cellulose acetobutyrate or a mixture of poly(vinylidene fluoride) and polymethyl methacrylate or polystyrene and poly(2,6-dimethylphen-1,4-ylene ether). Among these, the substrates (A) consisting of plastics are particularly preferred.

That surface of the dimensionally stable substrate (A) which faces the recording layer (B) to be applied may have structures.

The structures on the surface of the substrate (A) are in the micrometer and/or submicrometer range. They are used for exact guidance of the read laser beam and ensure a rapid and exact response of the tracking servo and autofocusing means in the laser-optical readwrite heads of the disk drives, i.e. they permit or improve tracking. Furthermore, these structures may themselves be data, as is the case, for example, in the known audio or video compact disks, or they can be used for coding the recorded data. The structures consist of raised parts and/or indentations. These are in the form of continuous concentric or spiral tracks or in the form of isolated hills and/or holes. Moreover, the structure may have a more or less smooth wave form. The tracks are preferred here. They have a rectangular sawtooth-like, a V-shaped or a trapezoidal contour in their transverse direction. Their indentations are generally referred to as grooves and their raised parts as land. Particularly advantageous are tracks having 50–200 nm deep and 0.4–0.8 μm wide grooves separated in each case by a 1–3 μm wide land.

The dimensionally stable substrate (A) particularly preferably used in the novel process is produced in a conventional manner by shaping the plastic or mixture of plastics which forms the substrate (A) by injection molding under clean-room conditions, as described in detail, for example, in German Patent Application P No. 37 27 093.1 (O.Z. 0050/39384).

The dimensionally stable substrates (A) having tracks on one of their surfaces are very particularly preferably produced in this manner. They are used below for the novel process.

Production of the dimensionally stable substrate (A) is followed by application of the recording layer (B) to that surface of the substrate (A) which is provided with tracks.

The recording layer (B) is preferably applied by sputtering. For this purpose, their components, i.e. the lanthanides and transition metals, are sputtered from a target under greatly reduced pressure in a known manner and deposited on the relevant surface of the dimensionally stable substrate (A) in the desired composition and thickness, in the form of an amorphous, thermally alterable lanthanide/transition metal alloy.

Advantageously, the recording layers (B) are produced in a thickness of from 10 to 500 nm on the surface of the substrates (A).

The lanthanides Pr, Nd, Sm, Eu, Gd, Tb, Dy and Ho and the transition metals Fe and Co are suitable for the production of the recording layers (B). Suitable mixing ratios of lanthanides with transition metals are known from the prior art. Furthermore, other elements, such as Sc, Y, La, Ti, Zr, Hf, V, Nb, Ta, Cr, Mo, W, Mn, Re, Ru, Os, Rh, Ir, Pd, Pt, Cu, Ag, Au, Zn, B, Al, Ga, In, Si, Ge, Sn, Pb, P, As, Sb and/or Bi, may be concomitantly used in the production of the recording layers (B), in suitable amounts known from the prior art.

The result of these process steps is the two-layer material comprising (A) the optically transparent dimensionally stable substrate which consists of the abovementioned materials and one of whose surfaces has tracks, and (B) the thermally alterable recording layer consisting of an amorphous lanthanide/transition metal alloy of suitable composition and thickness.

In the further course of the embodiment under discussion of the process according to the invention, the film ($C_1$) is produced, in process step (I), on that side of the recording layer (B) which faces away from the substrate (A).

According to the invention, the film ($C_1$) is used for producing the film (C), which performs the function of the anticorrosion film in the sheet-like, multilayer magneto-optical recording materials produced by the novel process and which is therefore referred to as anticorrosion film (C).

The film ($C_1$) is produced in a thickness of from 30 to 500 nm on the recording layer (B) by the procedure according to the invention. Because of the advantageous technical effects of the anticorrosion film (C) produced from the film ($C_1$) by the novel process, thicker films are unnecessary. Moreover, the material which has to be consumed for this purpose brings no further special advantages. The thickness of the film ($C_1$) should, however, not be less than 30 nm, since the barrier effect, to oxygen and water, of the anticorrosion film (C) produced from this by the novel procedure is then no longer completely satisfactory. Thicknesses of from 50 to 300 nm, in particular from 60 to 200 nm, are advantageous. The films ($C_1$) having this thickness are converted by the novel procedure into anticorrosion films (C) which have an optimum property profile with regard to the barrier action, the material consumption, the complexity of the production process, the mechanical strength, the toughness and the shelf life.

In the novel process, the films ($C_1$) are produced from two or more components. In most cases, excellent results are obtained with only two to four components. However, in special cases more than four components are also used in the novel process, more than ten components rarely being used.

The components of the films ($C_1$) are applied, according to the invention, in three or more separate layers, each consisting of one or more of the components, i.e. the film ($C_1$) is produced in such a way that it has a multilayer structure. In most cases, three, four or five separate layers are sufficient to give an excellent result, i.e. to give an anticorrosion film (C) having an optimum property profile. In special cases, six, seven or eight layers are used. Nine, ten or more layers are more rarely used, because the more complicated process involved here does not result in any further improvement in the result of the process, this result already being particularly advantageous. The use of three or four layers is particularly advantageous i the novel process, because this requires the least complicated process but still gives optimum results.

In the novel process, the separate layers are produced in different thicknesses. However, it is advantageous if they are produced in about the same thickness. They are produced in such a way that the transition from one layer to the next is abrupt, i.e. there is an exactly defined interface between the layers, as, for example, in the transition from a stoichiometric carbide, nitride or oxide layer ($C_{14}$) to a pure metal layer ($C_{13}$). However, production may be effected in such a way that the transition is fluid. For example, a stoichiometric carbide, nitride or oxide layer ($C_{14}$) over a zone in which the concentration of carbon, nitrogen or oxygen decreases more or less rapidly and the metal concentration increases more or less rapidly may have a transition zone with a pure metal layer ($C_{13}$). Furthermore, for example, oxide layers ($C_{14}$) may have an abrupt or fluid transition with carbide or nitride layers ($C_{14}$).

According to the invention, an advantageous production procedure is one in which a fluid transition is formed from one layer to the next, it being particularly advantageous if the oxide, carbide or nitride layers ($C_{14}$) form a transition zone with the metal layers ($C_{13}$) and the metal layers ($C_{13}$) form a transition zone with the oxide, carbide or nitride layers ($C_{14}$) in a similar manner.

According to the invention, the film ($C_1$) is produced in such a way that two or more layers consisting of one or more carbides, nitrides and/or oxides ($C_{14}$) are separated from one another by a 0.1-30 nm, advantageously 1-20 nm, in particular 3-15 nm, thick layer consisting of one or more of the elements ($C_{14}$) (=process feature $C_{16}$). The direct result of this proviso is that, after its production, film ($C_1$) consists of three or more layers, i.e. a layer consisting of one or more carbides, nitrides and/or oxides ($C_{14}$), a layer consisting of one or more of the elements ($C_{13}$) and a further layer ($C_{14}$). Of course, further layers ($C_{14}$) can be applied on top of this. Moreover, these further layers ($C_{14}$) can be separated from one another by further layers ($C_{13}$).

In the novel process, it is obligatory for the film ($C_1$) to be produced in such a way that the layer which is directly adjacent to, or faces, the recording layer (B) always consists of carbides, nitrides and/or oxides ($C_{14}$), corresponding to the claimed feature ($C_{17}$) of the process. It is particularly advantageous here if this layer ($C_{14}$) is produced from one or more nitrides or carbides, the use of a single nitride or carbide being very particularly advantageous. Furthermore, it is very particularly advantageous if the uppermost layer of the film ($C_1$), which layer faces away from the recording layer (B), is produced from one or more oxides ($C_{14}$), the use of a single oxide ($C_{14}$) being preferred.

It is also very particularly advantageous if the element layer(s) ($C_{13}$) is or are produced from one of the elements ($C_{13}$).

According to the invention, the components for the production of the element layers ($C_{13}$) are selected from the group consisting of the elements B, Al, Ga, In, Si, Ge, Sn, Pb, Sb, Bi, Mg, Ti, Zr, Hf, V, Nb, Ta, Cr, Mo, W, Fe, Co, Zn, Cd, La, Ce, Pr, Nd, Sm, Eu, Gd, Tb, Dy, Ho, Er, Tm, Yb, Lu and Th. Among these elements ($C_{13}$), B, Al, Si, Ti, Zr, Hf, V, Nb, Ta, Cr, Mo and W are preferably used and Al, Si, Ti and Ta are very particularly preferably used.

According to the invention, the components for the production of the element carbide, nitride and oxide layers ($C_{14}$) are selected from the group consisting of the carbides, nitrides and oxides of these elements ($C_{13}$). Among these, the carbides, nitrides and oxides of the elements B, Al, Si, Ti, Zr, Hf, V, Nb, Ta, Cr, Mo and W are preferably used and the carbides, nitrides and oxides of the elements Al, Si, Ti and Ta are very particularly preferably used. Among these, tantalum oxide, aluminum nitride, silicon carbide, silicon oxide and silicon nitride are noteworthy.

In the novel process, the order in which the various layers of the films ($C_1$) are applied is inevitably determined by the desired structure of the particular film ($C_1$) to be produced, this structure being defined in more detail by the process features described above.

Examples of orders of application which are particularly preferred in the novel process owing to their advantageous technical effect are, starting in each case from the surface of the recording layer (B), 1. Layer ($C_{14}$) - layer ($C_{13}$) - layer ($C_{14}$);
2. Layer ($C_{14}$) - layer ($C_{14}$) - layer ($C_{13}$) - layer ($C_{14}$);
3. Layer ($C_{14}$) - layer ($C_{13}$) - layer ($C_{14}$) - layer ($C_{13}$);
4. Layer ($C_{14}$) - layer ($C_{13}$) - layer ($C_{13}$);
5. Layer ($C_{14}$) - layer ($C_{13}$) - layer ($C_{13}$) - layer ($C_{14}$);
6. Layer ($C_{14}$) - layer ($C_{13}$) - layer ($C_{14}$) - layer ($C_{13}$) - layer ($C_{14}$) or
7. Layer ($C_{14}$) - layer ($C_{13}$) - layer ($C_{13}$) - layer ($C_{14}$) - layer ($C_{14}$).

The production of the film ($C_1$) has no special features in terms of method and apparatus in step (I) of the novel process but is carried out by a conventional technique for the production of thin films by vapor deposition, reactive vapor deposition, ion plating, ion cluster beam deposition (ICB) or sputtering, including reactive sputtering of the components of the different layers of the film ($C_1$) in the desired order defined in more detail by the process features.

According to the invention, process step (I) is followed by the novel process step (II), in which the layer(s) of film ($C_1$) which consist of one or more of the elements ($C_{13}$) are reacted with oxygen, nitrogen and/or carbon.

In this procedure, the elements ($C_{13}$) in the relevant layer(s) are of course converted into the corresponding oxides, carbides and/or nitrides ($C_{14}$), so that new layers ($C_{14}$) result.

Whether these new layers ($C_{14}$) form further separate layers ($C_{14}$) or are an integral part of the existing adjacent layers ($C_{14}$) depends on the composition of the adjacent layers ($C_{14}$).

To induce the reaction, according to the invention, of an element layer ($C_{13}$) with oxygen, nitrogen and/or carbon, the said layer must be brought into contact with reactive oxygen, nitrogen and/or carbon.

Reactive oxygen, nitrogen and/or carbon are thermally and/or electrically excited oxygen and nitrogen molecules, oxygen, nitrogen and carbon atoms and oxygen, nitrogen and carbon ions. The reactive carbon species are predominantly in the form of an association of a plurality of atoms or ions, i.e. a cluster, which is produced, for example, from hydrocarbons.

Methods for the preparation of these reactive species are known. In general, they are produced under reduced pressure or greatly reduced pressure by heating, exposure to electromagnetic radiation and/or corpuscular radiation or bombardment by ions, after which they are brought into contact with the film ($C_1$) with the aid of electrical and/or magnetic fields and/or via thermal diffusion.

In many cases, the reactivity of the molecular oxygen with respect to an element layer ($C_{13}$) is so high that the abovementioned methods of excitation using energy can be dispensed with, without the time taken to achieve complete conversion of the relevant element layer ($C_{13}$) into an oxide layer ($C_{14}$) being excessively prolonged.

According to the invention, the use of molecular oxygen is therefore very particularly advantageous. Air or pure oxygen can be used under atmospheric, superatmospheric or reduced pressure.

The duration of action of the reactive species on the element layer(s) ($C_{13}$) of the film ($C_1$) until complete conversion of the said layer(s) is achieved is determined by many parameters, for example the type and amount of the reactive species, the temperature, the thickness of the film ($C_1$) and the nature of the elements ($C_{13}$), and therefore varies widely. In any case, the minimum duration of action must not be exceeded by too long a time, since otherwise the recording layer (B) will be damaged. However, the end point of the conversion can be determined in an excellent and simple manner in many cases, either visually or by a conventional optical method, so that damage to the recording layer (B) can easily be avoided: thus, the film ($C_1$), which, because of its element layer(s) ($C_{13}$), is opaque and may be highly reflective, becomes optically transparent once the conversion has reached an advanced stage, and the action of the reactive species can then be terminated immediately.

The novel process step (II) has no special features in terms of method and apparatus, but is carried out using conventional apparatuses as are generally employed for the production, handling and reaction of reactive gases.

The novel process step (II) may be followed by further process steps which are used for removing reactive species from the anticorrosion film (C) produced by the novel process, or for applying further films, such as interference and/or reflector films and/or further magnetizable layers.

The novel process step (II) or any subsequent process steps are followed by the conventional, defined magnetization of the recording layer (B) oriented at right angles to the surface in a manner typical for magneto-optical recording materials.

The result of the above embodiment of the novel process is the sheet-like, multilayer magneto-optical recording material comprising (A) the optically transparent dimensionally stable substrate, which consists of the abovementioned materials and one of whose surfaces has tracks, (B) the thermally alterable recording layer consisting of an amorphous lanthanide/transition metal alloy of suitable composition and thickness, and (C) the anticorrosion film which may be optically transparent and is produced in the manner described in detail above.

In a further embodiment of the novel process, two anticorrosion films (C) are produced from two films ($C_1$) on the two sides of the recording layer (B). Of course, in the production of the anticorrosion film (C) which is located on that side of the recording layer (B) which faces the substrate (A), the relevant film ($C_1$) is produced on the substrate (A), or on any interference film on the said substrate, prior to application of the recording layer (B), and is completely converted. In this case, of course, essentially the converse order of application of the individual separate layers of the film ($C_1$) has to be followed in order to satisfy the novel process features ($C_{16}$) and ($C_{17}$). Moreover, it is of course clear that the only films ($C_1$) which are used are those which, after they have been reacted, according to the invention, with oxygen, nitrogen and, if required, also carbon (process step II), give optically transparent films (C). On the other hand, the anticorrosion film (C), which is present on that side of the recording layer (B) which faces away from the substrate (A), is produced by the abovementioned first embodiment of the novel process, opaque films (C) also being suitable here.

In this embodiment of the novel process too, the novel process step (II) can be followed by the process step mentioned further above.

In this case too, the novel process step (II), or any process steps subsequent to this step, can be followed by the conventional, defined magnetization of the recording layer (B) oriented at right angles to the surface in a manner typical for magneto-optical recording materials.

The result of the second embodiment of the novel process is the sheet-like, multilayer magneto-optical recording material comprising (A) the optically transparent dimensionally stable substrate which consists of the abovementioned materials and whose surface has tracks, (C) the optically transparent, first anticorrosion film produced in the manner described in detail above, (B) the thermally alterable recording layer consisting of an amorphous lanthanide/transition metal alloy of suitable composition and thickness, and (C) the second (uppermost) anticorrosion film.

The novel process can, if required, also comprise conventional and known process steps. In addition to the abovementioned possibilities for applying further films on the uppermost anticorrosion film (C), interference and/or adhesion-promoting films can be produced between the substrate (A) and the recording layer (B) and/or the first anticorrosion film (C), further interference and/or reflector films can be produced on the recording layer (B) prior to application of the anticorrosion film (C) facing away from the substrate (A), or two recording materials produced in the novel manner are connected to one another in such a way that their recording layers (B) face one another to form a sandwich, the conventional and known techniques for connecting two disks being used.

However, these embodiments do not result in any changes in the novel process as such; instead, only additional conventional and known process steps are carried out, and/or the order of individual process steps is altered for clearly evident reasons. Thus, the particular advantages and technical effects of the novel process are fully retained, regardless of its embodiment and the design of the latter.

The novel process has particular advantages. For example, it permits, to a much greater extent than was possible in the past, the production of anticorrosion films (C) of different compositions in a simple and exactly reproducible manner, providing new possible methods, previously unrecognized or thought unfeasible, for adapting the anticorrosion film (C) to a given recording layer (B).

These advantages are also obtained in the case of the sheet-like multilayer magneto-optical recording materials produced by the novel procedure, in particular in the case of the corresponding disks.

Data in the form of magnetically reversed spots can be recorded on the recording materials produced by the novel process, in a conventional manner, from the side on which the optically transparent dimensionally stable substrate (A) is located, with the aid of a pulse-modulated write laser beam which has a wavelength $\lambda$ less than 1000 nm and is focused on the recording layers (B) and/or strikes the said layers at right angles. Thereafter, the data can be read with the aid of a continuous-wave laser beam which is focused on the recording layers (B) containing recorded data and/or strikes the said layers at right angles, the light reflected back by the recording layers (B) themselves or by any reflector films present being collected, analyzed and converted into signals. In the case of the disks produced in the novel manner, the conventional laser-optical disk drives having laser-optical heads which contain semiconductor lasers can be used for this purpose.

In this respect too, the recording materials obtained in the novel manner have particular advantages over the prior art. For example, they have greater sensitivity than known recording materials and can therefore be written using lower laser power. Magneto-optical disks produced according to the invention can therefore be written at higher disk speeds than the disks produced in a known manner, the laser power used being the same. Furthermore, their bit density is substantially higher than compared with the prior art. During reading, they give undistorted signals and have a signal/noise ratio of more than 55 dB. Even after storage for more than 1,000 hours at 70° C. and at a relative humidity of 90%, there is no increase in the bit error rate, i.e. no loss of information.

The recording materials have one or more scratch-resistant, hard, firmly adhering and mechanically strong anticorrosion films (C) which are not brittle and provide excellent protection for the air-sensitive and water-sensitive recording layers (B). Furthermore, the anticorrosion films (C) can be adapted in an excellent manner to the remaining films of the recording materials, with respect to their optical and mechanical properties and their adhesion properties.

EXAMPLES

Examples 1 to 4

Production of magneto-optical disks by the novel process, and the properties of the disks thus prepared
General experimental method:

Four 1.2 mm thick polycarbonate disks having a diameter of 130 mm and provided with tracks were produced by injection molding under clean-room conditions, as substrates (A).

Thereafter, the individual layers were applied to that side of the polycarbonate disks (A) which was provided with tracks, in the desired order and thickness and with the particular internal structure desired, from the gas phase. The interference films and the individual layers ($C_{14}$) of the films ($C_1$) were applied by sputtering the relevant metal and by mixing the desired amounts of hydrocarbons, oxygen and/or nitrogen via the gas phase. On the other hand, the recording layers (B) and the element layers ($C_{13}$) were produced by sputtering the relevant elements. In this procedure, the conditions were chosen so that the compositions of the data disks stated in Table 1 resulted. In Examples 1 and 4, the uppermost layer ($C_{14}$) (Example 2, $Al_2O_3$, Example 4, $TiO_2$) was produced by partial oxidation of the relevant element layer ($C_{13}$).

The disks thus obtained were exposed to pure activated oxygen under $10^{-1}$ mbar for from 10 to 60 seconds at 70° C. until the element layer(s) ($C_{13}$) of the particular films ($C_{14}$) had been completely converted into oxide layers ($C_{14}$), this procedure being carried out in a vacuum chamber which was equipped with two locks for automatic introduction and removal of disks, with connections for feeding-in oxygen and inert gases, with inspection windows, with an optical system for determining the reflectivity of the disks and with the conventional and known regulating systems for pressure and temperature. The end point of this reaction was determined with the aid of the optical system.

The recording layers (B) of the disks obtained in this manner were magnetized at right angles to their surface and written on with the aid of a conventional and known laser-optical disk drive. A pulse-modulated GaAlAs semiconductor laser which emitted linearly polarized light of wavelength $\lambda = 830$ nm was used here. Both the bit length, i.e. the spot diameter, and the bit spacing, i.e. the distance from spot to spot, were about 1 $\mu$m.

To read the recorded data via the Kerr effect (Examples 1 and 2) or via the Faraday effect (Examples 3 and 4), the GaAlAs semiconductor laser was used in the continuous-wave mode with a light output of less than 1 mW. The uncorrected bit error rate was determined in a conventional and known manner by means of a time interval analyzer (TIA). The disks were read directly after the writing process (first read operation), then stored for 1,000 hours at 70° C. and at a relative humidity of 90%, and then read again (second read operation). The relevant results are shown in Table 2.

Comparative Experiments C1 and C2

Production and properties of known recording materials

Two disks which were identical in structure and composition to the samples A-2 and B-5 disclosed in DE-A-No. 33 35 689 were produced by the method stated in Examples 1 to 4. The structure of the comparative disks is compared with the structure of the novel disks in Table 1. In the production of these comparative disks, the oxygen treatment was dispensed with.

The known disks $C_1$ and $C_2$ were magnetized, data was written on them and the disks were read and tested, these steps being carried out as in Examples 1 to 4. The experimental results obtained are compared with the values from Examples 1 to 4 in Table 2.

The comparison shows that the recording materials C1 and C2 of known composition were inferior to the novel recording materials with regard to the shelf life, which was evident from the substantially increased bit error rate of the known recording materials.

In Table 1 below, AlC is aluminum carbide, TiN is titanium nitride and SiN is silicon nitride.

TABLE 1

Structure and composition of disks produced according to the invention and not according to the invention

| | Interference film 1 (on substrate A) (nm) | Recording Layer (B) (nm) | Interference film 2 (on recording layer B) (nm) | Reflector film (nm) | Film ($C_1$): Layers ($C_{13}$) or ($C_{14}$) | | | | | Total thickness (nm) |
|---|---|---|---|---|---|---|---|---|---|---|
| | | | | | (nm) | (nm) | (nm) | (nm) | (nm) | |
| Example | | | | | | | | | | |
| 1 | SiO (80) | TbDyFe (80) | — | — | ALN (20) | ALC (20) | Ta (20) | $Ta_2O_5$ (10) | — | (70) |
| 2 | SiO (80) | TbDyFe (90) | — | — | ALN (20) | AL (20) | ALC (20) | AL (10) | $AL_2O_3$ (10) | (80) |
| 3 | SiO (80) | TbDyFe (25) | ALN (100) | AL (500) | SiC (20) | SiN (20) | Si (10) | SiO (20) | — | (70) |
| 4 | SiO (80) | TbDyFe (20) | ALN (300) | AL (500) | TiN (20) | $TiO_2$ (20) | Ti (20) | $TiO_2$ (20) | — | (80) |
| Comparative Experiment | | | | | | | | | | |
| C1 | — | TbDyFe (60) | $TiO_2$ (200) | — | $AL_2O_3$ (300) | — | — | — | — | (300) |
| C2 | — | TbDyFe (25) | $CeO_2$ (100) | AL (500) | CrN (300) | — | — | — | — | (300) |

| | Anticorrosing film (C): Layers ($C_{14}$) | | | | Total thickness |
|---|---|---|---|---|---|
| Example | (nm) | (nm) | (nm) | (nm) | (nm) |
| 1 | ALN (20) | ALC (20) | $Ta_2O_5$ (30) | — | (70) |
| 2 | ALN (20) | $AL_2O_3$ (20) | ALC (20) | $AL_2O_3$ (20) | (80) |
| 3 | SiC (20) | SiN (20) | SiO (30) | — | (70) |
| 4 | TiN (20) | TiO (60) | | | (80) |

TABLE 2

| | Experimental results Bit error rate (uncorrected) | |
|---|---|---|
| | 1st read operation | 2nd read operation |
| Example | | |
| 1 | $<10^{-5}$ | $<10^{-5}$ |
| 2 | $<10^{-5}$ | $<10^{-5}$ |
| 3 | $<10^{-5}$ | $<10^{-5}$ |
| 4 | $<10^{-5}$ | $<10^{-5}$ |
| Comparative Experiment | | |
| C1 | $10^{-5}$ | $>10^{-4}$ |
| C2 | $10^{-5}$ | $>10^{-4}$ |

I claim:

1. A process for the production of a magneto-optical recording element comprising
   (A) an optically transparent dimensionally stable substrate,
   (B) a thermally alterable recording layer consisting of an amorphous lanthanide/transition metal alloy, and
   (C) a film consisting essentially of multiple separate carbide, nitride and/or oxide layers, at least on that side of the recording layer (B) which faces away from the substrate (A), the said lanthanide/transition metal alloy being applied via the gas phase to the surface of the said substrate (A) or to the surface of a film (C) already present on the substrate (A) or of another film already present, resulting in the said recording layer (B), which process comprises:

(I) applying a 30–500 nm thick film ($C_1$) to surface of the recording layer (B) or to the surface of a further layer already present on the recording layer (B), said film ($C_1$) having the following specifications:

($C_{11}$) the film ($C_1$) consists of two or more components;
   ($C_{12}$) the said components are contained in three or more separate element and element carbide, nitride and oxide layers, each consisting of one or more of these components;
   ($C_{13}$) the components of the element layer or layers are selected from the group consisting of the elements boron, aluminum, gallium, indium, silicon, germanium, tin, lead, antimony, bismuth, magnesium, titanium, zirconium, hafnium, vanadium, niobium, tantalum, chromium, molybdenum, tungsten, iron, cobalt, zinc, cadmium, lanthanum, cerium, praseodymium, neodymium, samarium, europium, gadolinium, terbium, dysprosium, holmium, erbium, thulium, ytterbium, lutetium and thorium;
   ($C_{14}$) the components of the element carbide, nitride and oxide layer or layers are selected from the group consisting of the carbides, nitrides and oxides of the said elements ($C_{13}$);

($C_{15}$) directly adjacent layers consisting of the said carbides, nitrides and/or oxides ($C_{14}$) differ in composition from one another;

($C_{16}$) two or more of the layers consisting of the said carbides, nitrides and/or oxides ($C_{14}$) are separated from one another by one or more 0.1–30 nm thick layers consisting of one or more of the elements ($C_{13}$); and ($C_{17}$) that layer which is directly adjacent to the said recording layer (B) or which faces it always consists of the said carbides, nitrides and/or oxides ($C_{14}$);

said film ($C_1$) being applied by carrying out the following two process steps (11) and (12) several times:

(11) application of one or more layers consisting of one or more of the said carbides, nitrides and oxides ($C_{14}$) of the said elements ($C_{13}$) via the gas phase, resulting in one or more separate layers ($C_{14}$), and

(12) application of one or more 0.1–30 nm thick layers consisting of one or more of the elements ($C_{13}$), resulting in one or more element layers ($C_{13}$), followed by (II) reacting the said element layer or layers layers ($C_{13}$) of the said film ($C_1$) with a reactant selected from the group consisting of oxygen, nitrogen and carbon, and thereafter induction of a defined magnetization, oriented at right angles to the surface, in the said recording layer (B).

2. A process as defined in claim 1, wherein the outermost layer of the film ($C_1$), which layer faces away from the recording layer (B), consists of one or more oxides ($C_{14}$) of one or more of the elements ($C_{13}$).

3. A process as defined in claim 1, wherein that layer of the film ($C_1$) which is directly adjacent to the recording layer (B) or which faces it consists of one or more nitrides ($C_{14}$) of one or more elements ($C_{13}$).

* * * * *